Sept. 27, 1955   M. V. LONG   2,718,982
FLOW CONTROL SYSTEM
Filed Sept. 21, 1951
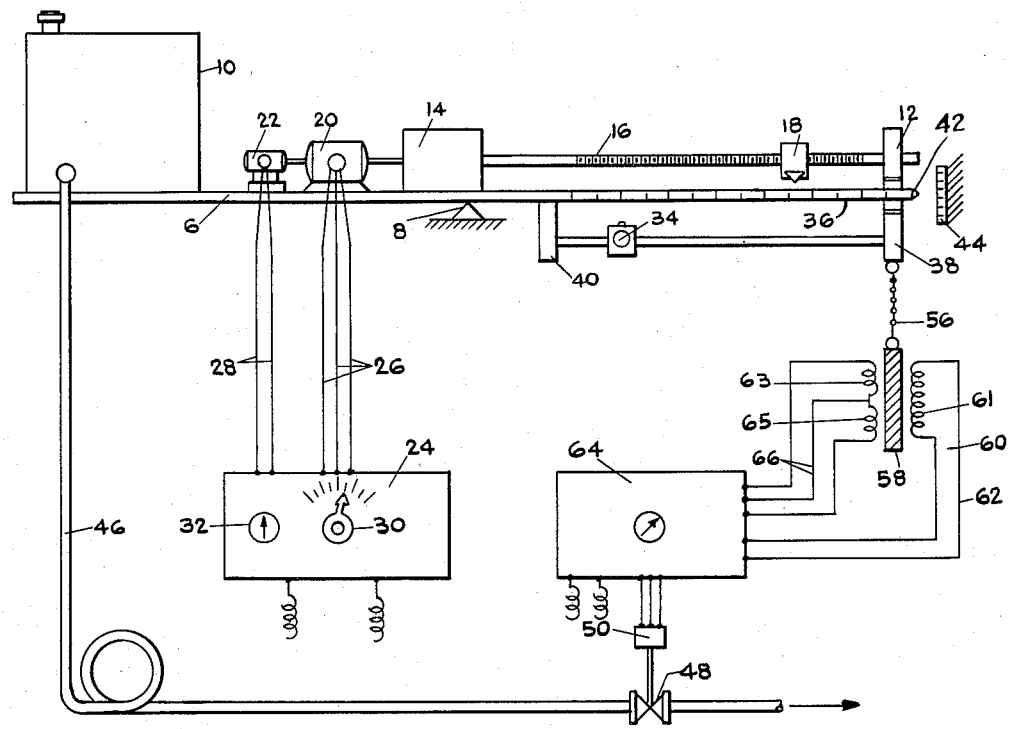
Inventor: Marion V. Long
By: [signature]
His Attorney

United States Patent Office

2,718,982
Patented Sept. 27, 1955

2,718,982

FLOW CONTROL SYSTEM

Marion V. Long, Berkeley, Calif., assignor to Shell Development Company, Emeryville, Calif., a corporation of Delaware Application September 21, 1951, Serial No. 247,620

2 Claims. (Cl. 222—58)

This invention pertains to flow control apparatus, and relates more particularly to a system wherein liquid flow is automatically controlled and metered by means responsive to weight measurements.

In certain cases, as when dealing with liquids having a varying specific gravity, or having varying amounts of solids or gases entrained or dissolved therein, it becomes sometimes desirable to measure and control liquid flow rates in terms of weight rather than in terms of volume.

It is therefore an object of this invention to provide for this purpose a system of high accuracy and high sensitivity.

The specific objects of this invention will be understood from the following description taken with reference to the attached drawing, the single figure whereof shows a diagram of the general arrangement of the present system.

Referring to the drawing, a beam member 6, which may be of the simple or the complex lever type, is shown balanced or supported on a pivot or fulcrum element 8, thus forming a beam scale structure. Carried in any suitable manner by the beam 6 to one side of the point of support 8 is a tank or reservoir 10, containing any desired quantity of the liquid whose rate of flow it is desired to control and to meter in terms of weight units. Carried longitudinally by the beam 6 to the other side of the point of support, for example, between a bracket member 12 and a gear reduction unit 14, is a lead screw 16, having a poise weight element 18 arranged thereon. Although a guide member may be used to prevent the weight 18 from rotating together with the lead screw, it is preferred to use a poise weight having its center of gravity disposed so with regard to its point of support on the lead screw that rotation of the weight 18 is prevented by the action of the force of gravity, the rotation of the lead screw resulting only in a displacement of the weight in a direction parallel to the longitudinal axis of the beam 6.

Carried on the beam scale structure, besides the gear reduction unit 14, are an electric motor 20, driving the lead screw through said gear reduction unit 14, and a tachometer 22 connected to a rate servo-controller unit 24 through leads 26 and 28, respectively. The tachometer 22, motor 20 and controller 24 form together a servo-control loop whereby the speed of the lead screw is constantly and precisely maintained at a pre-set value. An error signal derived from the tachometer 22, after being, if necessary, suitably differentiated and amplified by the controller 24, is used to maintain the speed of the motor 20 at a strictly constant pre-set value.

The construction of controller units such as 24 is well known and forms no part of this invention. A unit having a circuit such as shown in Fig. 8.3–3, page 206, "Servomechanisms and Regulating System Design," vol. 1., by H. Chestnut and R. W. Mayer, John Wiley and Sons, 1951, can be conveniently used. It will be sufficient to state that said unit preferably has a control or adjusting knob or dial 30 whereby the speed of the motor 20 may be adjusted or set at any desired value, and an indicating dial 32 indicating through the intermediary of the tachometer 22, the actual speed of motor 20. If desired, both controller 30 and dial 32, instead of being calibrated in revolutions per minute, may be calibrated directly in units suitable for the purposes of this invention, such as pounds, pounds per hour, ounces, ounces per minute, grams, grams per minute, milligrams, milligrams per second, etc., as will appear hereinbelow.

It should be particularly understood that the position of units 14, 20 and 22 with regard to the fulcrum 8 is not necessarily such as shown in Fig. 1, but may be varied in any desired way in accordance with design exigencies, being chosen so as to permit the weight 18, when properly placed on the lead screw 16, to counterbalance the tank 10 and the liquid therein. If desired, an additional tare weight 34, movable on a rod 36, supported between brackets 38 and 40, may be used to improve accuracy and to decrease the required value of weight 18. The actual position of the weight 18, or of weight 34, or both, may be indicated on a horizontal length scale carried by the beam 6, as indicated at 36.

It is also understood that, if desired, the tachometer 22 or gear reduction unit 14, or both, may be dispensed with, the lead screw being in such case directly driven by the motor 20, whose speed may be controlled or maintained constant in various ways well understood by electrical engineers.

The beam 6 is provided, preferably at one of its ends, with a pointer 42, whereby the balance or zero position of the scale structure is indicated on a fixed vertical length scale 44.

The tank 10 has liquid outlet means, such for example as a rubber hose 46, which is provided with a valve 48 operated by an electrically controlled motor 50.

Attached to the beam 6, also preferably near one of the ends thereof, is a wire, string, chain, rod, or other suitable element 56, supporting a movable control member 58.

For simplicity, one embodiment of said control member may be described here as a movable core element of a differential transformer 60 so arranged that a displacement of the core 58 results in a change of balance of flux linkage between the primary 61, energized through the leads 62, and the two secondary windings 63 and 65, thereby producing a differential error signal which varies in phase and amplitude as the core element is moved above and below its neutral position. This error signal varies as the time integral of the difference between the fluid discharge rate and the balance weight transfer rate. This signal is transmitted, through leads 66, to the input of an electronic control unit 64, where it is suitably phase detected, amplified and differentiated, to produce corrective signals proportional to the error, the derivative of the error and the time integral of the rate error to operate the motor or servo-mechanism 50 to open or close the valve 48. The construction of the unit 64 is conventional and forms no part of this invention. A unit having a circuit such as shown in Fig. 9—9, page 253, "Automatic Feedback Control" by W. R. Ahrendt and J. F. Taplin, McGraw-Hill Book Co., Inc., 1951, or on pp. 4 and 8, "Notes on Linear Variable Differential Transformers," Schaevitz Engineering, Camden, New Jersey, Bulletin 10–1–49, can be conveniently used, as will be readily understood by those skilled in electronics.

It will be understood that the movable core transformer 60 has been described hereinabove merely as an illustration of the many various instrumentalities, such for example, as movable-plate condensers, strain gauges, micro potentiometers, etc., which are suitable for the purposes of this invention. It is further understood that control is not necessarily applied by electrical means, since hydraulic or pneumatic means, such for example, as disclosed in U. S. Letters Patent No. 2,455,917, are equally suitable for this purpose, especially in case of large size installations.

The operations of the present system may be briefly summarized as follows. Assuming that it is desired to meter out a liquid from tank 10 at a predetermined rate, such for example as 20 grams per minute, the beam 6 is brought to proper balance by suitable manipulation of the weights 18 and 34, and the calibrated knob 30 of controller 24 is set to a dial division corresponding to 20 gr./min., as established by previous calibration. The circuits of controllers 24 and 64 being thereupon energized, the motor 20 begins rotating the lead screw 16 at a speed resulting in a velocity or displacement of the weight 18 toward the fulcrum point at a rate such as to establish the weight transfer rate desired. If the rate of flow of the liquid through the valve 48 is at this time different from that for which the system is pre-set, for example, if only 15 grams per minute are permitted to flow through valve 48, that arm of the lever 6 which supports the reservoir 10 will become heavier than the other lever arm, and the movable transformer core 58 will be pulled upward by the rising right-hand end of lever 6, sending an error signal to the controller 64. After suitable differentiation and amplification, this signal will be relayed to the valve motor 50 and applied thereto in such a manner as to cause the motor to open the valve 48. The flow through said valve will then proceed at an increased rate until the system has been rebalanced. If, after that, the left-hand side of the beam balance becomes too light because of excessive loss of fluid, the movable control member 58 will be moved down, and a resulting error signal of opposite polarity will cause the motor 50 to decrease the opening of valve 48 until balance has been once more achieved.

The accuracy with which the present system can be kept at the desired weight flow rate is very high: thus, using good workmanship and sufficiently refined electronic circuits, the error can be limited to 1 part in 25,000.

I claim as my invention:

1. Apparatus for maintaining a constant-weight rate of delivery of a flowing material, comprising a lever system supported on a fulcrum, a reservoir for said flowing material, the weight of said reservoir being supported by said lever system to one side of the fulcrum, a lead screw longitudinally mounted on the lever system and extending to the other side of the fulcrum, a poise weight riding on the lead screw, an electric motor mounted on the lever and coupled to the lead screw, electrical controller means having their output connected to energize said motor for rotating the lead screw at a predetermined constant rate, whereby said poise weight is caused to move along the lead screw toward the fulcrum at a predetermined constant rate corresponding to a desired rate of flow from said reservoir, a sensing element attached to an end of the lever and responsive to a departure of said lever from balance position to produce an error signal proportional to said departure, outlet means for said reservoir, a valve in said outlet means, electrical motor means for regulating the flow through said valve, second controller means having their input connected to said sensing element and their output connected to said valve motor means for energizing said valve motor means proportionally to the error signal from said sensing element, whereby the fluid flow through said valve is regulated proportionally to said error in such a manner as to correct the condition of the lever system causing the error signal.

2. Apparatus for maintaining a constant-weight rate of delivery of a flowing material, comprising a lever supported on a fulcrum, a reservoir for said flowing material, the weight of said reservoir being applied to said lever to one side of the fulcrum, a lead screw longitudinally mounted on the lever and extending to the other side of the fulcrum, a poise weight riding on the lead screw, an electric motor coupled to the lead screw, electrical controller means connected to energize said motor for rotating the lead screw at a predetermined constant rate, whereby said poise weight is caused to move along the lead screw at a rate corresponding to a desired rate of flow from said reservoir, a differential transformer comprising a movable core attached to an end of the lever and responsive to a departure of the lever from balance position to produce an error signal proportional to said departure, outlet means for said reservoir, a valve in said outlet means, electrical motor means for regulating the flow through said valve, second controller means having their input connected to the differential transformer winding and their output connected to said valve motor means for energizing said valve motor means proportionally to the error signal from the differential transformer whereby the fluid flow through said valve is regulated proportionally to said error in such a manner as to correct the condition of the lever system causing the error signal.

References Cited in the file of this patent

UNITED STATES PATENTS

| | | |
|---|---|---|
| 1,983,093 | Montgomery | Dec. 4, 1934 |
| 2,040,157 | Story et al. | May 12, 1936 |
| 2,100,316 | Harper | Nov. 30, 1937 |
| 2,541,915 | Culver | Feb. 13, 1951 |
| 2,544,155 | Harkenrider | Mar. 6, 1951 |
| 2,597,831 | Willis | May 20, 1952 |